March 7, 1933.  C. L. HEISLER  1,900,555
COMBINED MOTION PICTURE SOUND REPRODUCER
Filed April 26, 1928
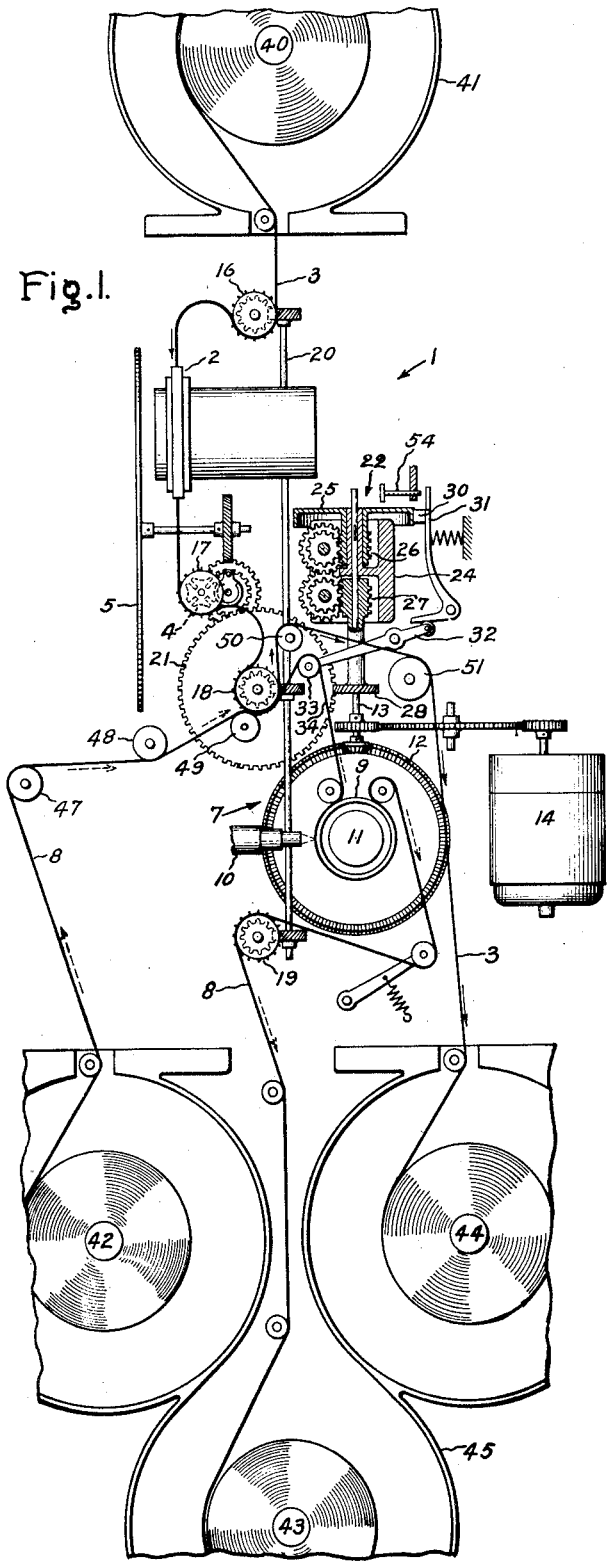
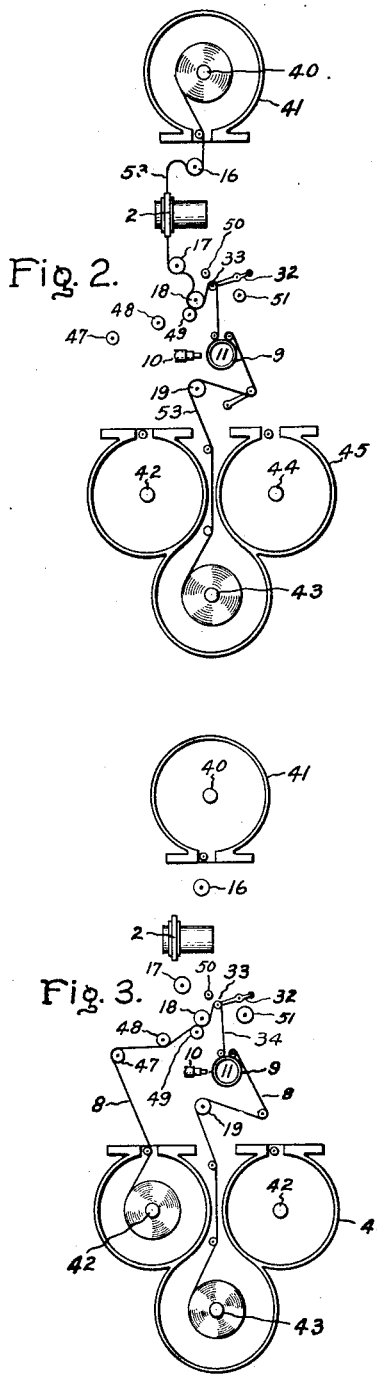
Inventor
Charles L. Heisler,
by Charles E. Tulla
His Attorney.

Patented Mar. 7, 1933

1,900,555

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

COMBINED MOTION PICTURE-SOUND REPRODUCER

Application filed April 26, 1928. Serial No. 273,126.

My invention relates to apparatus for simultaneously projecting motion pictures and for reproducing accompanying sounds from films. The picture and sound records may be on a single film or may be on separate films. It is an object of my invention to provide an improved apparatus of this character which is adapted to receive either a single film bearing both picture and sound records, the film passing successively through the picture projector and sound reproducer or to receive separate films bearing the respective picture and sound records. Another object of my invention is the provision of an improved apparatus of this character having means for supporting and housing a plurality of pairs of film reels.

My invention will be better understood from the following description taken in connection with the accompanying drawing, and its scope will be pointed out in the appended claims.

Referring to the drawing, Fig. 1 illustrates an embodiment of my invention equipped with separate picture and sound record films; Fig. 2 shows in an abbreviated manner the same embodiment equipped with a single film bearing both the picture and the sound records; and Fig. 3 is similar to Fig. 2 but equipped with a sound record only.

For the sake of simplicity and to more clearly illustrate the features of my invention, I have omitted from the drawing the enclosing casing, the supports for the various parts of the apparatus, the light sources, etc. and have confined the showing to only those parts which are most necessary to a clear understanding of my invention.

The picture projector 1 is of a common construction having the gate 2 through which the film 3 bearing the picture record is drawn with the desired intermittent movement produced for example by the Geneva movement 4, the shutter 5 being geared thereto to operate in the proper timed relation with the movements of the film. The sound reproducing mechanism 7 is of the form disclosed and claimed in my copending application, Serial No. 203,344, filed July 5, 1927. In this mechanism the film 8 bearing the sound record is supported and moved with a uniform speed by the drum 9. By means of a suitable optical system 10 light from a source, not shown, is focussed in a narrow beam on the film 8 bearing the sound record and on the opposite side of the film is the photo-electric cell 11. The current variations obtained by this cell after being amplified may be supplied to a loud speaker for the production of the sound recorded on the film in the well understood manner. Concentric with the drum 9 is the gear 12 which through suitable gearing including shaft 13 is rotated by the constant speed driving member 14 for which purpose I preferably employ where possible a synchronous motor.

For moving the picture film through the picture projector I have shown the sprockets 16 and 17, the latter having an intermittent motion and for moving the sound record fi m 8 on opposite sides of the drum 9 I have shown sprockets 18 and 19. Sprockets 16, 17, 18 and 19 are geared together through the shaft 20 which through the gear 21 and the compensating device 22 is connected to the shaft 13. This compensating device, as pointed out in my aforesaid application, is found necessary because of the difficulty of moving the sound record film at exactly the same speed by both the sprockets and the drum. As shown, it comprises the rotatable gear supporting frame 24 keyed to shaft 13. Brake drum 25 is mounted on driven gear 26 and driven gear 27 operates through gears 28 and 21, the sprocket 18 and the shaft 20. Brake 30 on lever 31 presses against the drum 25 with a variable pressure depending upon the position of the lever 32 carrying the idler 33 over which passes the loop 34 in the sound record film between the sprocket 18 and the drum 9. In the operation of the machine, if the loop 34 increases in size the brake is applied with greater force which results in a slower movement of the sprockets; conversely if the loop decreases in size the brake pressure is diminished with the result that the sprockets are driven somewhat faster until the former size of loop is restored. These variations are very small and have no visible effect upon the projected pictures.

In the drawing I have shown a single film reel support 40 in the housing 41 arranged above the picture and sound mechanism and three film reel supports 42, 43 and 44 in a composite housing structure 45 arranged below the mechanism. This structure forms a pair of spaced housings surrounding respectively the reel supports 42 and 44 and a third housing surrounding the reel support 43 and arranged below the space between the pair of housings, the adjacent walls of the latter forming a film channel leading from the third housing to the apparatus.

In addition to the above mentioned sprockets I provide rollers or idlers such as shown at 47, 48, 49, 50 and 51 and these rollers are so arranged relative to the sprockets, drum and reel supports that the machine may be used in a variety of different ways. In Fig. 1 I have shown the machine threaded with two separate films, a picture record film 3 and a sound record film 8. For convenience in tracing the films I have shown film 3 accompanied by full line arrows while film 8 is shown accompanied by dotted line arrows. It will be noted that both films engage and are driven by the same sprocket 18, hence they move in synchronism. From this sprocket, film 3 passes over rollers 50 and 51 to the reel on support 44; film 8 from the same sprocket passes over idler 33 to the drum 9 and thence to sprocket 19 and to the reel on support 43.

In Fig. 2 I have shown how the machine may be threaded with a single film 53 bearing both picture and sound records so that elements of the film shall pass successively through the picture projector and sound reproducer. In this case the single film passes from the sprocket 18 over idler 33 to the drum and finally to the reel on support 43.

If desired, the machine may be used for the projection of pictures only, in which case there will be but the one film 3. When so used the compensator is unnecessary and by means of the thumb screw 54 the brake 30 may be lifted clear of the drum 25. Also the machine may be operated if desired to reproduce sound only, in which case the machine will be threaded with the sound record film 8 only as shown in Fig. 3.

It is to be understood that wherever the term "sound reproducer" is used in the description and claims I refer to that part of the complete sound reproducing apparatus which is shown in the drawing rather than to the entire sound reproducing apparatus including the amplifying means and loud speaker.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:—

1. In apparatus of the character described, a unit comprising a motion picture projector, a sound reproducer and a common driving member therefor, a film reel housing arranged above said unit, and a plurality of film reel housings arranged below said unit, certain of said latter housings forming a channel therebetween through which a film may extend to another of said plurality of housings.

2. In apparatus of the character described, a structure adapted to support a plurality of film reels, said structure forming a pair of spaced reel housings and a third housing arranged opposite the space between the pair of housings, the adjacent walls of which form a film channel leading to said third housing.

3. A combined picture projecting and sound reproducing apparatus comprising means for supporting a first pair of reels, means for supporting a second pair of reels, separate picture projecting and sound reproducing elements having a common driving motor for the synchronous operation thereof, means arranged to guide a single record film between the reels of said first pair operatively through both of said elements serially, means arranged to guide a single record film between a reel of said first pair and a reel of said second pair inoperatively past one of said elements and means arranged to guide a single record film between a reel of said first pair and the other reel of said second pair inoperatively past the other of said elements.

In witness whereof, I have hereto set my hand this 25th day of April, 1928.

CHARLES L. HEISLER.